United States Patent Office 2,752,369
Patented June 26, 1956

2,752,369

OXIDATION OF STEROID-ENAMINES

Roman P. Holysz and John C. Babcock, Kalamazoo Township, Kalamazoo County, Mich., assignors to The Upjohn Company, Kalamazoo, Mich., a corporation of Michigan No Drawing. Application February 25, 1954,
Serial No. 412,637

15 Claims. (Cl. 260—397.3)

The present invention relates to a process of production of 20-ketopregnane compound and is particularly concerned with the oxidation of 22-tertiaryamino-$\Delta^{20(22)}$-steroids by chromic anhydride-heterocyclic amine complexes.

The process of the instant invention is illustratively presented by the formulae:

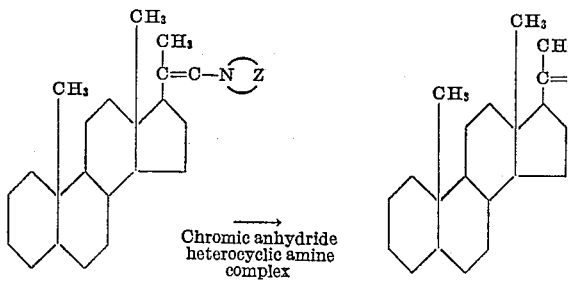

wherein —N͡Z represents a secondary amine radical in which Z represents the atoms necessary to complete two alkyl, hydroxy-alkyl or aralkyl radicals or a carbocyclic or heterocyclic ring system.

The chromic anhydride-heterocyclic amine complexes, essential to the above-shown reaction, were first studied by Sisler, Bush and Accountius, J. Am. Chem. Soc. 70, 3827 (1948), but were not known to be oxidants. The first application of these complexes as oxidizing reagents was made in the course of the work of the total synthesis of adrenal steroids by Sarett et al., J. Am. Chem. Soc. 75, 423 (1953), in obtaining from 4b-methyl-7-ethylenedioxy - 1,2,3,4,4a$\alpha$,4b,5,6,7,8,10,10a$\alpha$ - dodecahydrophenanthrene-11$\beta$-ol-4-one (I) the 4b-methyl-7-ethylenedioxy-1,2,3,4,4a$\alpha$,4b,5,6,7,8,10,10a$\alpha$ - dodecahydrophenanthrene 1,4-dione (II):

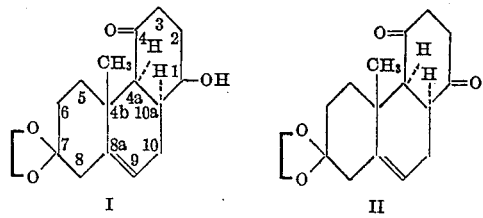

Sarett et al. noted that compound I had not only an acid sensitive group (the ketal group) but also a double bond. Chromic acid as commonly used in acetic acid or aqueous sulfuric acid would have hydrolyzed the ketal group. N-bromoacetamide in a basic or neutral solvent attacks double bonds [S. Bell et al., Biochem. J. 42, 516 (1948)]. Sarett decided to try the chromic anhydride-pyridine complex which showed inertness to ketal linkages, thioether linkages as well as the double bonds [Sarett, J. Am. Chem. Soc. 75, page 425, second column, last six lines of first paragraph (1953)]. It was therefore surprising and unexpected to find that in the instant process the chromic anhydride-pyridine complex would split a 20,22-double bond of a 22-tertiaryamino-$\Delta^{20(22)}$-steroid with high yields.

It is an object of the present invention to provide a novel method of oxidizing a 22-tertiaryamino-$\Delta^{20(22)}$-steroid to obtain a 20-ketosteroid. Another object of this invention is to provide a method for producing progesterone. A further object of the present invention is to provide an oxidation method in a basic medium with the avoidance of changes of acid sensitive groups. Other objects of the present invention will be apparent to those skilled in the art to which this invention pertains. The process is useful in the production of physiologically and therapeutically active 20-ketosteroids or 20-ketosteroids which serve as intermediates for physiologically active steroids by the oxidation of 22-tertiaryamino-$\Delta^{20(22)}$-steroids. For example, oxidation of 22 - N - piperidyl-4,20(22) - bisnorcholadien - 3 - one yields progesterone; oxidation of 22 - N - piperidyl - 4,20(22) - bisnorcholadiene - 3,11 - dione yields 11 - ketoprogesterone (effective in the treatment of ketosis of cattle); from the oxidation of 11$\beta$ - acetoxy - 22 - N - piperidyl - 5,20(22) - bisnorcholadien - 3 - one 3 - ethylene ketal followed by acid hydrolysis 11$\beta$ - acyloxyprogesterone is obtained which by vigorous alkali hydrolysis in ethylene glycol yields 11$\beta$ - hydroxyprogesterone possessing an ACTH suppressing function; oxidation of 3$\alpha$,12$\alpha$ - dihydroxy - 22 - N-morpholinyl - 20(22) - bisnorcholene yields pregnane-3,12,20 - trione (Selye, Encyclopedia of Endocrinology, vol. IV, A. W. T. Franks Publishing Company; Montreal, 1943, p. 603), oxidation of 3$\alpha$,12$\alpha$ - diacetoxy - 22 - N-morpholinyl - 22 - bisnorcholene gives 3$\alpha$,12$\alpha$ - diacetoxypregnan-20-one which can be converted by enol acetylation, epoxidation, hydrolysis, and acetylation to the known 3$\alpha$,12$\alpha$ - diacetoxy - 17$\alpha$ - hydroxypregnan - 20 - one used by W. J. Adams et al. [J. Pharm. and Pharmacol. 5, 861 (1953)] to produce anticortisone active 21 - acetoxy-12$\alpha$,17$\alpha$ - dihydroxy - 4 - pregnene - 3,20 - dione. Oxidation of 22 - N - piperidyl - 3$\beta$ - acetoxy - 5,20(22) - bisnorcholadiene yields pregnenolone acetate. Oxidation of 3-keto - 22 - N - pyrrolidyl - 4,9(11),20(22) - bisnorcholatriene yields 9(11) - dehydroprogesterone [Ruff et al., J. Chem. Soc. 3683 (1953)].

The starting materials for the novel invention are the steroid 22-enamines represented by the formula:

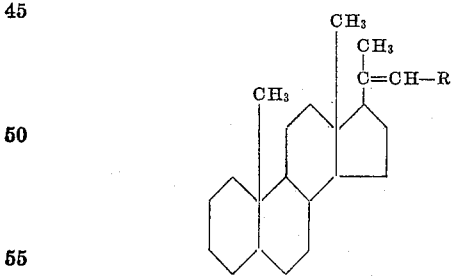

wherein R is a tertiaryamino radical attached at the nitrogen atom, such as, for example, dialkylamines like diethylamine, dibutylamine, dioctylamine, and didodecylamine, and the like; cycloalkylamines such as dicyclohexylamine, dicyclopentylamine, and the like; cyclic amines such as piperidine, pyrrolidine, tetrahydroquinoline, oxazolidine (tetrahydrooxazole), morpholine and the like; aralkylalkylamines such as methylbenzylamine, ethylbenzylamine and the like; diaralkylamines such as dibenzylamine and the like; substituted dialkylamines such as 2,2'-dichlorodiethylamine and the like; and arylalkylamines such as N-methylaniline, N-methyltoluidine, N-methylanisidine, and the like. However, it is preferred, for convenience and economy, to use secondary amines, especially cyclic amines whose molecular weights are between approximately seventy and approximately 150, such as pyrrolidine, piperidine, morpholine, tetrahydroquinoline, oxazolidine and alkyl derivatives thereof, and the like. The dimethylcyclopentanopolyhydrophenanthrene radical of the steroid may have substituents such as hydroxy, acyloxy, methyl, ether, and thioether groups in positions 3, 6, 7, 8, 9, 11, 12, 14, 16, 17, and others, or keto, ketal cyclic ketal groups in positions 3, 4, 6, 7, 11, 12, 15, and 16, or bridges such as maleic acid, maleic anhydrides, epoxy or epidioxy, and the like.

Secondary hydroxyl groups, if present in the dimethylcyclopentylpolyhydrophenanthrene radical, are oxidized to the corresponding keto groups.

The 22-enamines are prepared by heating a steroid 22-aldehyde with a secondary amine, preferably a cyclic amine such as pyrrolidine, piperidine, oxazoline, morpholine, their alkyl derivatives and the like in the manner shown in detail by Herr and Heyl, J. Am. Chem. Soc. 74, 3627 (1952).

Representative steroid enamines which may be used in the instant invention are the enamines, especially the 22-N-piperidyl, 22-N-pyrrolidyl, and 22-N-morpholinyl enamines of bisnorcholan-22-al, 3-acetoxybisnorcholan-22-al, 3-benzoyloxybisnorcholan-22-al, 3-methoxybisnorcholan-22-al, 3-benzyloxybisnorcholan-22-al, 3-ketobisnorcholan-22-al, 3-ketobisnor-4-cholen-22-al; the maleic anhydride, maleic acid, and maleic acid diester adducts of 5,7-bisnorcholadien-22-al, 3-acetoxy-5,7-bisnorcholadien-22-al, 3-benzoyloxy-5,7-bisnorcholadien-22-al, 3-keto-5,7-bisnorcholadien-22-al, 3-acetoxy-9,11-bisnorcholadien-22-al, 3-keto-9,11-oxido,5,7-bisnorcholadien-22-al, prepared by methods heretofore described in the art [Heyl et al., J. Am. Chem. Soc. 69, 1957 (1947); 70, 2953 (1948); 72, 2617 (1950); Bergman et al., J. Org. Chem. 13, 10–20 (1948)]; 3β-acetoxy-5α,8α-epidioxybisnorcholan-22-al, [Clayton et al., J. Chem. Soc. 2015–2021 (1953)]; 3β,5α-diacetoxy-9α,11α-epoxy-7-bisnorcholen-22-al [Bladon et al., J. Chem. Soc. 2921 (1953)]; 3,11-diketobisnor-4-cholen-22-al [obtained by oxidation of 3-keto-11α,22-dihydroxy-4-bisnorcholene (Peterson and Murray U. S. Patent 2,602,769, col. 53, lines 31 to 65) with aluminum-tetriary butoxide in diethylketone], 3-keto-11β-acetoxy-4-bisnorcholen-22-al 3-ethylene ketal (Preparation 1), 3α,12α-dihydroxybisnorcholan-22-al (Preparation 2), 3α,12α-diacetoxybisnorcholan-22-al (Preparation 3), 3-keto-4,9(11)-bisnorcholatrien-22-al (Preparation 4) and the like.

In carrying out the process of the present invention, the selected 22-tertiaryamino-$\Delta^{20(22)}$-steroid, preferably in solution in an organic solvent such as pyridine, picoline, quinoline, benzene, chloroform, cyclohexane, toluene, methylene dichloride, ethylene dichloride, chlorobenzene, and the like, is added to the solution of the chromic anhydride-heterocyclic amine complex. Chromic anhydride-heterocyclic amine complex refers to addition compounds produced by the ability of the nitrogen atom in a nitrogen containing heterocyclic ring system to share its free electrons with chromic anhydride. The empirical formula of these addition complexes shows a combination of one molecule of chromic anhydride with two molecules of an aromatic heterocyclic amine containing the amino nitrogen in a five or six-membered ring, the other ring members being carbon atoms. The heterocyclic ring may have substituents such as alkyl radicals in positions α, β or γ to the nitrogen atom and/or may be condensed with another ring such as a benzene ring. The preferred complex is the complex of chromic anhydride with pyridine. However, other heterocyclic amines such as quinoline, α, β and γ-picolines are also useful. The preparation of such chromic anhydride-heterocyclic amine preparation is described in detail by Sisler, Bush, and Accountius, J. Am. Cem. Soc. 70, 3827 (1948) and by Sarett et al., J. Am. Chem. Soc. 75, 423 (1953). In any preparation of the chromic anhydride-pyridine complex precaution should be taken to prevent the mixture from burning, suitably by adding the chromic anhydride slowly to the heterocyclic amine (not the heterocyclic amine to the chromic anhydride), thus avoiding any temporary or local excess of chromic anhydride. Cooling and stirring of the solvent during the addition of chromic anhydride is helpful though not necessary if the additions of chromic anhydride are made in small portions. Usually the ratio of heterocyclic amine to chromic anhydride is from five to twenty parts of amine to one part of chromic anhydride. If less than ten parts of amine are used, the amine is preferably diluted with an inert solvent such as benzene, toluene, chloroform, methylene dichloride, chlorobenzene, and the like, with benzene and chloroform preferred. The complex formed is only moderately soluble, most of the material being in suspension or in the form of a slurry. To the slurry or suspension of the chromic anhydride-heterocyclic amine is added under continuous agitation the solution of the selected 22-tertiaryamino-$\Delta^{20(22)}$-steroid. In the preferred embodiment the solution containing the steroid is added dropwise under continuous stirring and while the suspension of the chromic anhydride heterocyclic complex is cooled to a temperature between about minus ten and about plus fifteen degrees centigrade, preferably between about zero and about ten degrees. Temperatures between minus ten degrees and lower down to the temperature of the melting point of the mixture are also operative. After the reaction mixture has been stirred for one to four hours at temperatures preferably below ten degrees centigrade, the mixture is allowed to warm up to room temperature, about twenty to thirty degrees centigrade, and stirred for a period of four to thirty hours. Thereafter the excess chromic anhydride heterocyclic amine complex is destroyed, illustratively by the addition of hydrochloric acid and sodium bisulfite keeping the temperature of the reaction mixture low by cooling the reaction vessel or by adding crushed ice to the reaction mixture. The product, a 20-ketosteroid, is obtained from the mixture by conventional means, illustratively by extraction with water-immiscible solvent, such as ether, benzene, chloroform, methylene dichloride, and the like.

The following examples are illustrative of the process and products of the present invention, but are not to be construed as limiting.

PREPARATION 1.—11β-ACETOXY-22-N-PIPERIDYLBISNOR-5,20(22)-CHOLADIEN-3-ONE 3-ETHYLENE KETAL

A mixture of 3.3 grams of 3,11-diketobisnor-4-cholenic acid (obtained by chromic acid oxidation of 3-ketobisnor-11α,22-dihydroxy-4-cholene, Murray and Peterson U. S. Patent 2,602,769, issued July 8, 1952) and ten milliliters of oxalyl chloride in benzene in the presence of pyridine was heated in a fifty-milliliter flask equipped with a reflux condenser for a period of thirty minutes. The reflux condenser was then removed and the excess of oxalyl chloride was eliminated by distillation under reduced pressure.

The thus-obtained 3,11-diketobisnor-4-cholenic acid chloride was then reduced to the aldehyde by the preferred method of Weygand et al. [Angew. Chem. 65, 525 (1953)]. For this purpose, the crude (and cooled) acid chloride was dissolved in 100 milliliters of benzene and to this solution was added 4.5 milliliters of methylaniline. The four-fold excess of methylaniline is necessary to compensate for the hydrochloride produced in the reaction and for traces of oxalyl chloride remaining in the crude 3,11-diketobisnor-4-cholenic acid chloride. The mixture was heated for ten minutes on the water bath, cooled and thereafter transferred to a separatory funnel. The cooled benzene solution was washed successively with three five-milliliter portions of water, a fifteen-milliliter portion of five percent hydrochloric acid, a fifteen-milliliter portion of five percent sodium hydroxide solution and five-milliliter portions of water until the washwater was neutral to phenolphthalein. The benzene solution was then evaporated and the product, 3,11-diketobisnor-4-cholenic acid methylanilide was once recrystallized from methanol and water.

The 3,11-diketobisnor-4-cholenic acid methylanilide thus-obtained, admixed with three milliliters of distilled ethylene glycol, 150 milligrams of para-toluenesulfonic acid and sixty milliliters of benzene was placed in a reaction flask equipped with a reflux condenser and a water trap. The mixture was heated under reflux with stirring for ten hours. The water which was formed was removed by codistillation with benzene and collected in the water trap. The reaction mixture was cooled, washed with dilute sodium bicarbonate solution and with water, and then dried and concentrated to dryness under reduced pressure. The 3-ethylene ketal of 3,11-diketobisnor-5-cholenic acid methylanilide, a white crystalline residue, was repeatedly recrystallized from ethyl acetate-Skellysolve B (hexanes).

To a solution of 1.2 grams of lithium aluminum hydride dissolved in 100 milliliters of anhydrous ether was added dropwise the thus-obtained 3-ethylene ketal of 3,11-diketobisnor-5-cholenic acid methylanilide dissolved in 35 milliliters of tetrahydrofuran. The resulting mixture was stirred for one-half hour at a temperature of zero to five degrees centigrade, thereafter for one hour at room temperature (about 25 degrees centigrade) after which time it was refluxed for another hour and then cooled and hydrolyzed with fifteen milliliters of water. The organic layer was separated by decantation and the remaining paste was suspended in water and repeatedly extracted with methylene dichloride. The combined ether and methylene dichloride solutions were concentrated to give a quantitative yield of crystalline 3-ethylene ketal of 3-ketobisnor-11β-hydroxy-5-cholen-22-al.

The 3-ethylene ketal of 3-ketobisnor-11β-hydroxy-5-cholen-22-al, dissolved in thirty milliliters of acetic acid, was admixed with five milliliters of acetic anhydride and 0.3 gram of toluenesulfonic acid and allowed to stand overnight at room temperature (about 22 to 25 degrees centigrade). The resulting mixture was poured into 200 milliliters and the resulting solids, 3-ethylene ketal of 3-ketobisnor-11β-acetoxy-5-cholen-22-al, were recovered by filtration, washed with water and dried. The 11β-acetylation was made according to the method of Oliveto et al., Arch. Biochem. Biophys. 43, 234 (1953); J. Am. Chem. Soc. 75, 5486 (1953).

A mixture of 2.25 grams of 3-ketobisnor-11β-acetoxy-5-cholen-22-al 3-ethylene ketal, fifty milliliters of thiophene-free benzene and two milliliters of piperidine was placed in a distilling flask equipped with a reflux condenser so arranged that the condensed vapors passed through eight grams of absorbent anhydrous aluminum oxide particles before returning to the reaction zone, and the mixture was heated under reflux for two hours under an atmosphere of nitrogen. The benzene was then removed at subatmospheric pressure and the residue was thoroughly agitated with ten milliliters of methanol. The methanolic extract was then cooled to about four degrees centigrade for three and one-half hours, filtered, and the filter cake washed with about one milliliter of cold methanol and dried to obtain the 11β-acetoxy-22-N-piperidylbisnor-5,20(22)-choladien-3-one 3-ethylene ketal.

In a manner similar to Preparation 1, 3-ketobisnor-4-cholenic acid which is a hitherto discarded by-product in the preparation of 3-ketobisnor-4-cholen-22-al, an intermediate in the progesterone synthesis from stigmasterol, can be easily converted to 3-ketobisnor-5-cholen-22-al 3-ethylene ketal by the method of Weygand, by treating the 3-ketobisnor-4-cholenic acid with oxalyl chloride to obtain 3-ketobisnor-4-cholenyl chloride, treating the acid chloride thus obtained with methylaniline to obtain 3-ketobisnor-4-cholenic acid methylanilide, converting the methylanilide with ethylene glycol to the 3-ketal in order to protect the 3-keto group from reduction and reducing the thus-obtained 3-ketobisnor-5-cholenic acid methylanilide 3-ethylene ketal with lithium aluminum hydride to obtain 3-ketobisnor-5-cholen-22-al 3-ethylene ketal, which may be converted to the 3-ketobisnor-22-N-pyrrolidyl-5,20(22)-choladiene 3-ethylene ketal which by oxidation with the chromic anhydride pyridine complex yields the 3-ethylene ketal of progesterone, valuable for further synthetic steps (cf. Example 4).

PREPARATION 2.—3α,12α - DIHYDROXYBISNORCHOLAN-22-AL AND 3α,12α-DIHYDROXY-22-N-MORPHOLINYL-20(22)-BISNORCHOLENE

In the manner described in Example 1, 3α,12α-dihydroxybisnorcholan-22-al was obtained by the method of Weygand from bisnordesoxycholic acid. Bisnordesoxycholic acid was first converted to the 3α,12α-diester illustratively by treating the pyridine solution of bisnordesoxycholic acid with acetic anhydride. The thus-obtained diester was treated with thionyl chloride to give the 3α,12α-diacetate of bisnordesoxycholyl chloride then with methylaniline to give the 3α,12α-diacetate of bisnordesoxycholic acid methylanilide and reduced with lithium aluminum hydride to give 3α,12α-dihydroxybisnorcholan-22-al.

Heating 3α,12α-dihydroxybisnorcholan-20-al with morpholine in the manner given in Preparation 1 produces 3α,12α - dihydroxy - 22 - N - morpholinyl - 20(22) - bisnorcholene.

PREPARATION 3.—3α,12α - DIACETOXYBISNORCHOLAN-22-AL AND 3α,12α-DIACETOXY-22-N-MORPHOLINYL-20(22)-BISNORCHOLENE

One gram of 3α,12α-dihydroxybisnorcholan-22-al (Preparation 2), dissolved in three milliliters of pyridine, was admixed with one milliliter of acetic anhydride and allowed to stand for two hours at room temperature. The reaction mixture was thereupon poured into fifty milliliters of cracked ice and water, and the thus-produced precipitate, crude 3α,12α-diacetoxybisnorcholan-22-al, recovered by filtration. Recrystallization of the crude material from methanol gave pure 3α,12α-diacetoxybisnorcholan-22-al.

Heating 3α,12α-diacetoxybisnorcholan-22-al with morpholine in the manner given in Preparation 1 produces 3α,12α - diacetoxy - 22 - N - morpholinyl - 20(22) - bisnorcholene.

PREPARATION 4.—3-KETO-22-N-PIPERIDYL-4,9(11),20(22)-BISNORCHOLATRIENE

One gram of 11α,22-dihydroxy-3-keto-4-bisnorcholene, dissolved in five milliliters of pyridine was treated with one-half milliliter of trimethylacetyl chloride. After standing for six hours at room temperature, the reaction mixture was poured into water and the thus obtained aqueous mixture was extracted repeatedly with chloroform. The combined chloroform extracts were washed with dilute acid to remove excess pyridine and then water, dried and evaporated to give 11α-hydroxy-22-trimethylacetoxy-3-keto-4-bisnorcholene.

To the crude material, dissolved in five milliliters of pyridine, 0.5 gram of toluenesulfonyl chloride was added. The reaction flask was tightly stoppered to keep moisture from the reaction mixture and stored for a period of sixteen hours in a refrigerator. Thereafter the flask containing the reaction mixture was allowed to warm up at room temperature (about 25 degrees centigrade) and the reaction mixture was poured into about 100 milliliters of water. The thus-obtained precipitate, crude 11α-tosyloxy-22-trimethylacetoxy-3-keto-4-bisnorcholene, was collected on a filter, washed with water, dried and then dissolved in five milliliters of acetic acid. To this solution was added 0.5 gram of potassium acetate and the mixture was refluxed for a period of four hours. The reaction mixture was then poured into water and the precipitate 22-trimethylacetoxy-3-keto-4,9(11)-bisnorcholadiene was collected on a filter, washed and transferred into a solution of 0.3 gram of sodium hydroxide in five milliliters of alcohol. The reaction mixture was allowed to stand for a period of two hours at room temperature (about 25 degrees centigrade), then diluted with fifty milliliters of water and neutralized with a few drops of dilute hydrochloric acid. The precipitate, 22-hydroxy-3-keto-4,9(11)-bisnorcholadiene, was collected on a filter, washed with water and recrystallized twice from methanol.

The thus-obtained purified 22-hydroxy-3-keto-4,9(11)-bisnorcholadiene, dissolved in fifty milliliters of benzene previously dried over sodium wire and two grams of quinone was refluxed with one gram of aluminum isopropoxide for a period of eighteen hours. The mixture after cooling was then diluted with dilute 25 percent sulfuric acid and extracted with methylene chloride. The methylene chloride extracts were concentrated on the water bath and the material thus-obtained was twice recrystallized from methanol to give 3-keto-4,9(11)-bisnorcholadiene-22-al.

The 3-keto-4,9(11)-bisnorcholadiene-22-al, dissolved in twenty milliliters of benzene and one milliliter of piperidine was heated under reflux for a period of two hours under an atmosphere of nitrogen. The benzene was then removed by distillation under reduced pressure and the residue was thoroughly agitated with three milliliters of methanol. The methanolic extract was then cooled to about zero degrees centigrade for a period of four hours, filtered, and washed with water and cold aqueous methanol solution. The thus obtained material was dried to yield 3-keto-22-N-piperidine-4,9(11),20(22)-bisnorcholatriene.

*Example 1.—Progesterone*

Six grams (sixty millimoles) of chromic anhydride was added in portions, of about 0.3 gram each, to sixty milliliters of anhydrous pyridine over a period of twenty minutes. The pyridine solution was continually stirred and kept at a temperature of zero to five degrees centigrade during the addition. The chromic anhydride at first dissolved to give a yellow solution; then an orange colored precipitate formed. To the stirred suspension was added a solution of 11.87 grams (thirty millimoles) of 22-N-piperidyl-4,20(22)-bisnorcholadien-3-one, dissolved in ninety milliliters of anhydrous pyridine during a period of approximately one hour. The temperature of the mixture during the addition was kept between five to ten degrees centigrade. The mixture darkened immediately. It was stirred for an additional two hours at eight to ten degrees centigrade and then for fifteen hours at ten to 28 degrees centigrade. The dark reaction mixture was thereafter poured into 200 milliliters of concentrated hydrochloric acid and two hundred grams of crushed ice. Thereto was added 100 milliliters of benzene and 25 grams of sodium bisulfite and the mixture after thorough shaking was separated into an aqueous and an organic layer. The dark green aqueous layer was extracted with two 100-milliliter portions of benzene. The combined benzene extract was washed successively with fifty milliliters of ten percent hydrochloric acid solution, fifty milliliters of water, two fifty-milliliter portions of ten percent sodium hydroxide solution, fifty milliliters of water, fifty milliliters of ten percent hydrochloric acid solution and two fifty-milliliter portions of water. The resulting colorless benzene solution was filtered and concentrated to dryness at reduced pressure, yielding 6.7 grams (71 percent yield) of crude progesterone. Recrystallization of the crude material yielded 3.83 grams, 41.9 percent of progesterone, of melting point 127 to 129 degrees centigrade.

*Example 2.—Progesterone*

In the manner given in Example 1, 1.193 grams of 22-N-piperidyl-4,20(22)-bisnorcholadien-3-one in ten milliliters of chloroform was oxidized with a solution of one gram of chromic anhydride in three milliliters of anhydrous pyridine and seven milliliters of absolute chloroform at a temperature between ten and fifteen degrees centigrade. A total yield of 633 milligrams (67.1 percent) of pure progesterone of melting point 128 to 130 degrees centigrade was obtained.

In the same manner as given in Examples 1 and 2, when reacting other 22-tertiaryaminobisnor-4,20(22)-choladien-3-ones with pyridine, picoline, quinoline, or other heterocyclic-chromic anhydride complexes, progesterone is produced. Illustrative of such representative starting material is: 22-N-pyrrolidyl-bisnor-4,20(22)-choladien-3-one, 22-N-morpholinyl-bisnor-4,20(22)-choladien-3-one, 22-N-dibenzylamino-bisnor-4,20(22)-choladien-3-one, 22-N-dimethylamino-bisnor-4,20(22)-choladien-3-one, 22-N-diethylamino-bisnor-4,20(22)-choladien-3-one, 22-N-dibutylamino-bisnor-4,20(22)-choladien-3-one, 22-N-dicyclohexylamino-bisnor-4,20(22)-choladien-3-one, 22-N-tetrahydroquinolinyl-bisnor-4,20(22)-choladien-3-one, 22-N-dioctylamino-bisnor-4,20(22)-choladien-3-one, 22-N-oxazolidino-bisnor-4,20(22)-choladien-3-one, 22-N-(N-methylanilino)-bisnor-4,20(22)-choladien-3-one, 22-N-(N-methyltoluidino)-bisnor-4,20(22)-choladien-3-one, 22-N-(N-methylanisidino)-bisnor-4,20(22)-choladien-3-one, 22-N-diethanolamino-bisnor-4,20(22)-choladien-3-one, 22-N-methylbenzylamino-bisnor-4,20(22)-choladien-3-one, and the like.

*Example 3.—11-ketoprogesterone*

In the manner given in Example 1, 22-N-piperidylbisnor-4,20(22)-choladiene,3,11-dione was oxidized with a solution of the chromic anhydride-pyridine complex in pyridine solution to give 11-ketoprogesterone.

*Example 4.—11β-acetoxyprogesterone 3-ethylene ketal and 11β-acetoxyprogesterone*

In the manner given in Example 1, 11β-acetoxy-22-N-piperidyl-5,20(22)-bisnorcholadien-3-one 3-ethylene ketal (Preparation 1) was oxidized with chromic anhydride pyridine complex in chloroform solution to yield 11β-acetoxyprogesterone 3-ethylene ketal.

Hydrolysis with hydrochloric acid of 11β-acetoxyprogesterone 3-ethylene ketal yields 11β-acetoxyprogesterone.

*Example 5.—Pregnane-3,12,20-trione*

In the same manner as given in Example 2, 3α,12α-dihydroxy-22-N-morpholinyl-20(22)-bisnorcholene was oxidized with chromic anhydride in pyridine to yield pregnane-3,12,20-trione.

*Example 6.—3α,12α-diacetoxypregnan-20-one*

In the same manner as given in Examples 1 and 2, by oxidizing 3α,12α-diacetoxy-22-N-morpholinyl-20(22)-bisnorcholene with chromic anhydride in pyridine, 3α,12α-diacetoxypregnan-20-one is obtained.

*Example 7.—Pregnenolone acetate*

In the same manner as given in Example 1, 3β-acetoxybisnor-22-N-piperidyl-5,20(22)-choladiene was oxidized with chromic anhydride in α-picoline to give pregnenolone acetate.

*Example 8.—3-acetoxy-5,7-pregnadien-20-one-5,8-maleic anhydride*

In the same manner as given in Example 1, 3-acetoxybisnor-22-N-pyrrolidyl-5,7,20(22)-cholatriene-5,8 - maleic anhydride was oxidized with chromic anhydride in β-picoline to give the maleic anhydride adduct of 3-acetoxy-5,7-pregnadien-20-one.

*Example 9.—9(11)-dehydroprogesterone*

In the same manner as given in Example 1, 3-keto-22-N-piperidyl-4,9(11),20(22)-bisnorcholatriene (Preparation 4) was selectively oxidized with chromic anhydride in pyridine to yield 9(11)-dehydroprogesterone. It should be noted that mild oxidation of $\Delta^{9(11)}$-steroids with chromic anhydride in acetic acid leads to $\Delta^{8(11)}$-12-ketosteroids and 9α(11α)-epoxides [Reichstein et al., Helv. Chim. Acta 26, 492 (1943); ibid. 26, 536 (1943), ibid. 30, 1420 (1947); Reich and Lardon, ibid. 30, 329 (1947); Shoppee, ibid. 30, 766 (1947)].

In a manner similar to Examples 1 thru 9, other 20-keto-pregnane compounds may be obtained by the oxidation of selected 22-tertiaryamino-$\Delta^{20(22)}$-steroid compounds with a chromic anhydride-hetorocyclic amine complex.

It is to be understood that this invention is not to be limited to the exact details of operation shown and described as obvious modifications and equivalents will be apparent to one skilled in the art and the invention is therefore to be limited only by the scope of the appended claims.

We claim:

1. A process for the production of 20-ketopregnane compounds which comprises: reacting a 22-tertiaryamino-$\Delta^{20(22)}$-steroid with a chromic anhydride-heterocyclic amine complex to obtain a 20-ketopregnane.

2. A process for the production of a 20-ketoprognane which comprises: reacting a 22-cycloamino-$\Delta^{20(22)}$-steroid with a chromic anhydride-heterocyclic amine complex to obtain a 20-ketopregnane.

3. A process for the production of a 20-ketopregnane which comprises: reacting a 22-cycloamino-20(22)-bisnorcholene with a chromic anhydride-heterocyclic amine complex at a temperature between about minus ten and plus thirty degrees centigrade to obtain the corresponding 20-ketopregnane.

4. A process for the production of a 20-ketopregnane which comprises: reacting a 22-N-piperidyl-20(22)-bisnorcholene with a chromic anhydride-pyridine complex at a temperature between about minus ten and plus thirty degrees centigrade, and isolating the thus-produced 20-ketopregnane.

5. A process for the production of progesterone which comprises: oxidizing a 22-tertiaryamino-4,20(22)-bisnorcholadien-3-one with a chromic anhydride-heterocyclic amine complex at a temperature between minus ten and plus thirty degrees centigrade and recovering the thus-produced progesterone.

6. The process of claim 5 wherein the 22-tertiaryamino-bisnor-4,20(22)-choladien-3-one is 22-N-piperidyl-4,20(22)-bisnorcholadien-3-one.

7. The process of claim 5 wherein the chromic anhydride-heterocyclic amine complex is a chromic anhydride-pyridine complex.

8. A process for the production of 11$\beta$-acetoxyprogesterone 3-ethylene ketal which comprises: reacting an 11$\beta$-acetoxy-22-N-piperidyl-5,20(22)-bisnorcholadien-3-one 3-ethylene ketal with a chromic anhydride-heterocyclic amine complex at a temperature between minus ten and plus thirty degrees centigrade, and isolating the thus-produced 11$\beta$-acetoxyprogesterone 3-ethylene ketal.

9. The process of claim 8 wherein the chromic anhydride-heterocyclic amine complex is the chromic anhydride-pyridine complex.

10. A process for the production of pregnenolone acetate which comprises: reacting a 3$\beta$-acetoxybisnor-22-N-piperidyl-5,20(22)-choladiene with a chromic anhydride-heterocyclic amine complex at a temperature between minus ten and plus thirty degrees centigrade and isolating the thus-produced 3$\beta$-acetoxypregnenolone.

11. The process of claim 10 wherein the chromic anhydride-heterocyclic amine complex is the chromic anhydride-$\alpha$-picoline complex.

12. A process for the production of pregnane-3,12,20-trione which comprises: reacting a 3$\alpha$,12$\alpha$-dihydroxy-22-N-morpholinyl-20(22)-bisnorcholene with a chromic anhydride-heterocyclic amine complex at a temperature between minus ten and plus thirty degrees centigrade and isolating the thus-produced pregnane-3,12,20-trione.

13. The process of claim 12 wherein the chromic anhydride-heterocyclic amine complex is the chromic anhydride-pyridine complex.

14. A process for the production of 3$\alpha$,12$\alpha$-diacetoxy-pregnan-20-one which comprises: reacting a 3$\alpha$,12$\alpha$-diacetoxy-22-N-morpholinyl-20(22)-bisnorcholene with a chromic anhydride-heterocyclic amine complex at a temperature between minus ten and plus thirty degrees centigrade and isolating the thus-produced 3$\alpha$,12$\alpha$-diacetoxy-pregnan-20-one.

15. The process of claim 14 wherein the chromic anhydride-heterocyclic amine complex is the chromic anhydride-pyridine complex.

References Cited in the file of this patent

UNITED STATES PATENTS

| | | |
|---|---|---|
| 2,313,732 | Butenandt | Mar. 16, 1943 |
| 2,433,848 | Julian | Jan. 6, 1948 |
| 2,601,287 | Heyl | June 24, 1952 |

OTHER REFERENCES

Fieser et al.: Natural Products Related to Phenanthrene, 3d ed., pp. 424–426 (1949).